(12) United States Patent
Pierno et al.

(10) Patent No.: US 8,326,096 B2
(45) Date of Patent: Dec. 4, 2012

(54) LOW SWITCHING VOLTAGE, FAST TIME RESPONSE DIGITAL OPTICAL SWITCH

(75) Inventors: Luigi Pierno, Rome (IT); Massimiliano Dispenza, Rome (IT)

(73) Assignee: Selex Sistemi Integrati S.p.A., Rome (IT)

( * ) Notice: Subject to any disclaimer, the term of this patent is extended or adjusted under 35 U.S.C. 154(b) by 241 days.

(21) Appl. No.: 12/673,341

(22) PCT Filed: Aug. 14, 2007

(86) PCT No.: PCT/IT2007/000586
§ 371 (c)(1),
(2), (4) Date: Apr. 22, 2010

(87) PCT Pub. No.: WO2009/022360
PCT Pub. Date: Feb. 19, 2009

(65) Prior Publication Data
US 2011/0150387 A1   Jun. 23, 2011

(51) Int. Cl.
*G02B 6/26* (2006.01)
*G02B 6/42* (2006.01)
(52) U.S. Cl. .............. 385/22; 385/40; 385/41; 385/45
(58) Field of Classification Search ............ 385/22, 385/40, 41, 45
See application file for complete search history.

(56) References Cited

U.S. PATENT DOCUMENTS

| | | | |
|---|---|---|---|
| 4,070,092 A | 1/1978 | Burns | |
| 5,123,069 A * | 6/1992 | Okayama et al. | 385/16 |
| 5,339,369 A | 8/1994 | Hopfer et al. | |
| 2006/0023288 A1 | 2/2006 | McBrien et al. | |
| 2006/0198581 A1 | 9/2006 | Belmonte et al. | |

(Continued)

FOREIGN PATENT DOCUMENTS
EP   0 898 197 A1   2/1999
(Continued)

OTHER PUBLICATIONS
International Search Report and Written Opinion for Application No. PCT/IT2007/000586, dated Mar. 20, 2008.
(Continued)

*Primary Examiner* — Rhonda Peace
(74) *Attorney, Agent, or Firm* — Marshall, Gerstein & Borun LLP (57) ABSTRACT

Disclosed herein is a digital electro-optical switch (1) comprising: an electro-optical substrate (3); a Y-shaped optical waveguide (2) formed in the substrate (3) and including an input branch (4) configured to be connected to an input optical waveguide, and two output branches (5) configured to be connected to respective output optical waveguides; and electrically conductive electrodes (6, 7) formed on the substrate (3) and including an inner electrode (7) arranged between the output branches (5), substantially at a branching area of the optical waveguide (2), and two outer electrodes (6) arranged outside the output branches (5), on opposite sides of the inner electrode (7), the outer electrodes (6) being electrically operable to make the electro-optical switch (1) operative between a first switching state wherein transmission of optical energy is enhanced between the input branch (4) and a first one of the output branches (5), and substantially inhibited in a second one of the output branches (5), and a second switching state wherein transmission of optical energy is enhanced between the input branch (4) and the second output branch (5), and substantially inhibited in the first output branch (5); and an optically transparent, electrically conductive film (9) arranged between each electrode (6, 7) and the substrate (3).

15 Claims, 4 Drawing Sheets

U.S. PATENT DOCUMENTS

2011/0150387 A1* 6/2011 Pierno et al. .................... 385/14

FOREIGN PATENT DOCUMENTS

| JP | 61-198133 A | 9/1986 |
| WO | WO-02/23262 A1 | 3/2002 |
| WO | WO-2004/021082 A2 | 3/2004 |

OTHER PUBLICATIONS

International Preliminary Report on Patentability for Application No. PCT/IT2007/000586, dated Oct. 1, 2009.

* cited by examiner

| Parameter for 1x2 switch | TE + TM | TE |
|---|---|---|
| Operating wavelength | 1550 nm | 1550 nm |
| Optical Insertion Loss (fiber-to-fiber) | < 3.0 db | < 3.0 db |
| Switching Voltage (1 KHz) | < ± 45 v | < ± 18 v |
| Switching time | < 10 nsec | < 10 nsec |
| Crosstalk (TE) | > 40 db | > 30 db |
| Crosstalk (TM) | > 20 db | |
| Impedance | > 1 MΩ | > 1 MΩ |
| Operative Temperature Range | 10-50 °C | 10-50 °C |
| Stability vs Time | 10 sec | 10 sec |
| Optical Polarisation Insensitive | Yes | No |

Fig. 8

LOW SWITCHING VOLTAGE, FAST TIME RESPONSE DIGITAL OPTICAL SWITCH

CROSS-REFERENCE TO RELATED APPLICATIONS

This application is the U.S. phase of International Application No. PCT/IT2007/000586, filed Aug. 14, 2007

TECHNICAL FIELD OF THE INVENTION

The present invention relates in general to a digital optical switch (DOS) and, more particularly, to a low switching voltage, fast time response digital electrically driven optical (electro-optical) switch.

BACKGROUND ART

As is known, since the early days of the telephone and telegraph, communications signals have traditionally been transmitted over copper wires and cables. In recent years, however, an increasing volume of communications signals are transmitted in the form of light beams over optical waveguides and fibers. Various types of peripheral equipments, such as connectors and switches based On optical waveguides have been developed. In particular, a technology known as integrated optics is widely used in handling optical communication signals. Using this technology, communication signals in the form of light beams are transmitted through optical waveguides formed in substrates made of electro-optical materials such as lithium niobate ($LiNbO_3$).

Although integrated optics is now widely used in transmitting signals, the use of this technology for switching and routing functions is still limited by the difficulty in making optical switching devices with adequate characteristics and performances. In a digital optical switch, an optical signal is received at an input and is selectively supplied to one or more of a plurality of outputs. Up to now, digital optical switches based on different technologies have been developed, in particular Micro-Electro-Mechanical Systems (MEMS), magneto-optical and electro-optical switches, the latter exhibiting faster time responses than the former ones.

Figure 1:
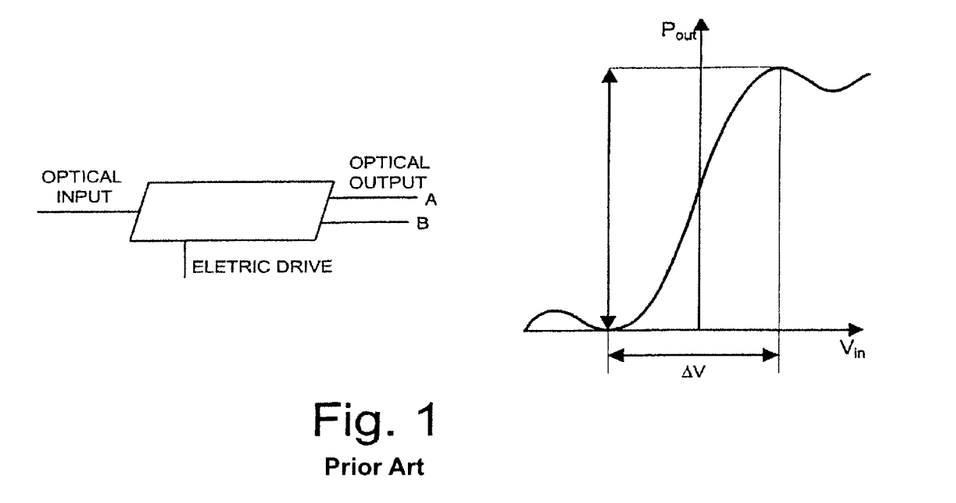
FIG. 1 shows a standard representation of an 1×2 digital electro-optical switch, along with a response function thereof.

FIG. 1 shows a standard representation of a 1×2 digital electro-optical switch, exhibiting an optical input, where an input optical signal is fed, an electrical input, where an electrical drive signal in the form of a switching voltage is fed to electrically drive the digital electro-optical switch, and two optical outputs, where the input optical signal is selectively supplied as result of the electrical drive signal. FIG. 1 also shows a step-like response function of the electro-optical switch, showing optical power at an optical output versus the electrical drive signal.

Figure 2:
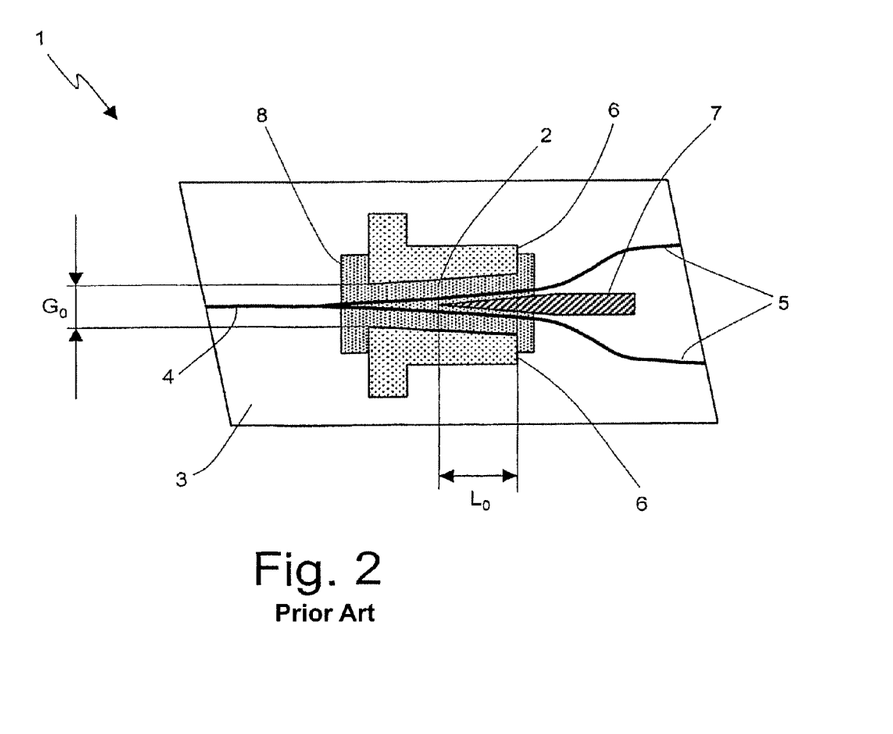
FIG. 2 shows schematically a known digital electro-optical switch.

An example of a known digital electro-optical switch is disclosed in EP0898197 and shown in FIG. 2. The digital electro-optical switch 1 basically includes an Y-shaped optical waveguide 2 formed in a 0.2-1 mm-thick substrate 3 of electro-optical material, e.g. lithium niobate (oriented along X-cut in the displayed configuration).

The Y-shaped optical waveguide 2 comprises an input branch 4 configured to be connected, in use, to an input optical waveguide (not shown), and two output branches 5 configured to be connected, in use, to respective output optical waveguides (not shown). The input optical waveguide, the output waveguides, and Y-shaped optical waveguide 2 are preferably monomodal optical waveguide formed in a conventional manner, for example in the case of lithium niobate substrate by selectively diffusing titanium into the substrate itself.

The digital electro-optical switch 1 further comprises an electrode structure including a plurality of 1-30 μm-thick electrically conductive electrodes formed of gold or similar metals on a surface of the substrate 3, in a conventional manner, and so arranged to be operatively coupled to Y-shaped optical waveguide 2 so as to cause an optical signal received at the input branch 4 to be selectively supplied to only one of the two output branches 5. In particular, the electrode structure is electrically driven so as to make the digital electro-optical switch 1 operating between two switching states: a first switching state wherein transmission of optical energy is enhanced between the input waveguide and a first output waveguide, while substantially inhibited in the second output waveguide, and a second switching state wherein transmission of optical energy is enhanced between the input waveguide and the second output waveguide, while substantially inhibited in the first output waveguide.

More in detail, the electrode structure is arranged at a branching area of the optical waveguide 2, and includes an inner electrode 7 arranged between output branches 5, and two outer electrodes 6 arranged outside the output branches 5, on opposite sides of, and symmetrically to the inner electrode 7.

Typically, the inter-electrode gap $G_0$ (distance between adjacent electrodes 6, 7) ranges from 4 to 20 μm, the gap $D_0$ between each electrode 6, 7 and the adjacent output branch 5 of the optical waveguide 2 ranges from 3 to 10 μm, and the interaction length $L_0$ (length of the portion of inner electrode 7 between the outer electrodes 6) ranges from 1 to 30 mm.

The inner electrode 7 is generally grounded, while a switching voltage is applied across the outer electrodes 6 to generate an electric field between the outer electrodes 6 and the inner electrode 7, through the output branches 5 arranged therebetween, and having a direction transversal to a propagation direction of the optical signal in the output branch 5, in the example considered (X-cut $LiNbO_3$ substrate) in a direction parallel to a Z crystal axis.

The electro-optical properties of the substrate 3 allows the switching voltage to change the refractive indexes of the output branches 5 in an opposing manner, namely to increase the refractive index in one output branch 5 and to decrease the refractive index in the other output branch 5. When a threshold electric field is achieved, the input optical signal is supplied only to the output branch 5 with higher refractive index.

Figure 3:
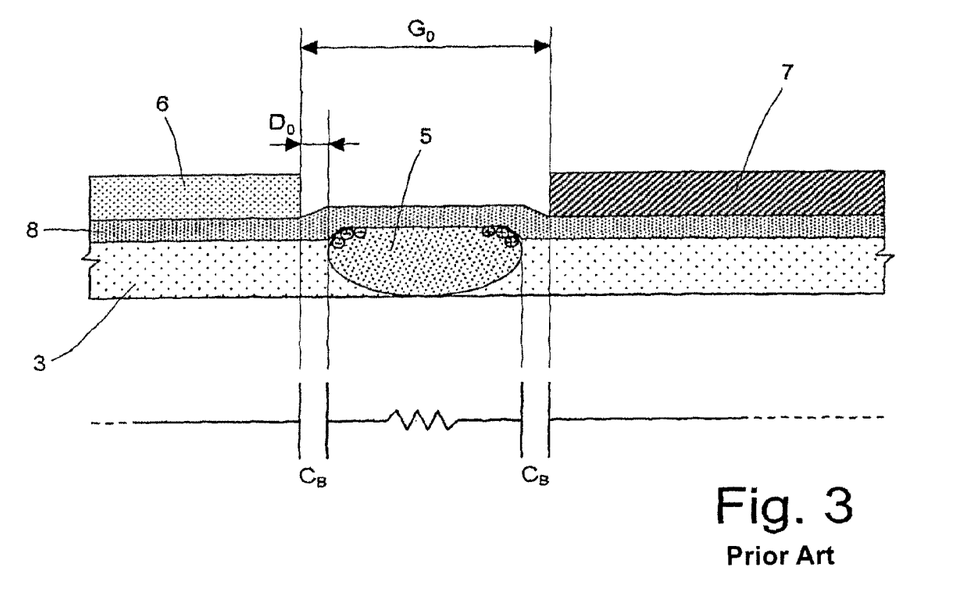
FIG. 3 shows a cross-section of an area of the digital electro-optical switch of FIG. 1, along with an electrical dynamic model thereof.
Figure 4:
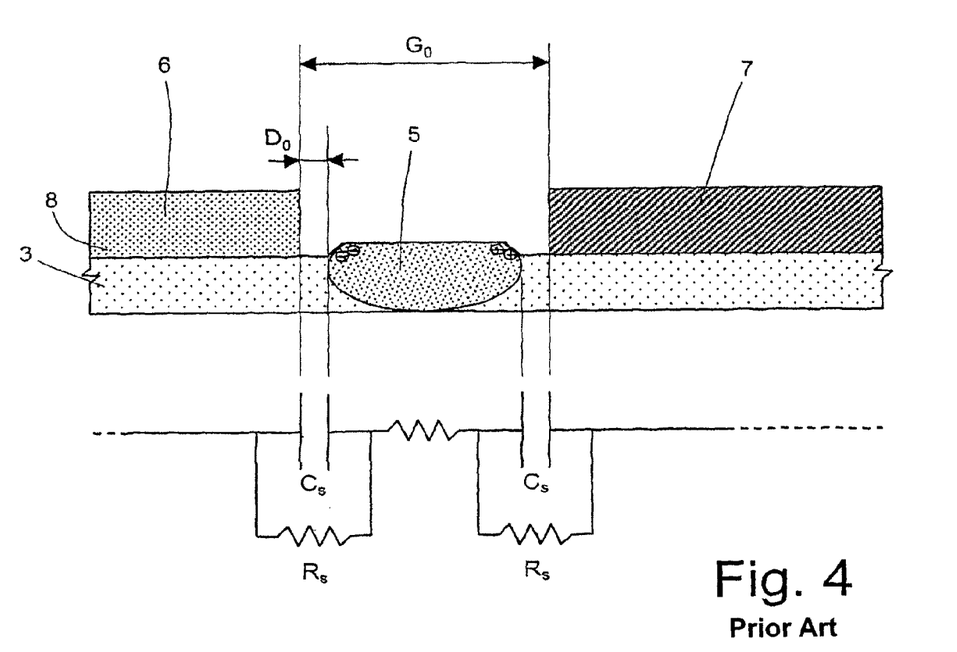
FIG. 4 shows a cross-section of a known digital electro-optical switch without a buffer layer underneath the electrodes, along with an electrical dynamic model thereof.

As the optical energy flowing through the digital electro-optical switch 1 is not completely confined into the optical waveguide 2, to prevent or minimize optical losses due to the absorption of the residual optical energy flowing outside the optical waveguide 2 by the electrodes 6, 7, these are to be isolated from the optical waveguide 2. Normally, as shown in FIG. 3, isolation is ensured by a 0.1-1.0 μm-thick continuous dielectric ($SiO_2$) buffer layer 8 which is formed at the branching area of the optical waveguide 2, between the surface of the substrate 3 and the electrodes 6, 7, and extends for the whole length of electrodes 6 and 7. Instead, in those applications where the dielectric buffer layer 8 does not contribute to RF performance of the digital electro-optical switch 1, no dielectric buffer layer 8 is formed between the surface of the substrate 3 and the electrodes 6, 7, and isolation is ensured as shown in FIG. 4, namely by arranging the electrodes 6, 7 further apart from the optical waveguide than the embodiment shown in FIG. 3, to mitigate optical radiation absorption. In this embodiment, the inter-electrode gap $G_0$ typically ranges from 4 to 20 μm, and the distance $D_0$ between each electrode 6, 7 and the adjacent output branch 5 of the optical waveguide 2 ranges from 3 to 10 µm.

OBJECT AND SUMMARY OF THE INVENTION

The Applicant has noticed that although digital electro-optical switches of the type described above exhibit a faster time response than digital optical switches based on different technologies, they however require higher switching voltages. In fact, isolation of the optical waveguide from the electrodes limits the effective electrical field applied to the optical waveguide and hence the so-called electro-optical efficiency of the digital electro-optical switch, and this limitation is generally compensated by means of an appropriate increase in the switching voltage.

Moreover, in digital electro-optical switches with a dielectric buffer layer, the electro-optical efficiency is further limited by a screening effect due to the existence of a capacitive coupling between the electrodes and the optical waveguide. In fact, formation of the optical waveguide (which includes Ti deposition and diffusion) generally produces damages in the substrate crystal, and free electrical charges are generated. When a DC voltage is applied between the electrodes, the free electrical charges move on the surface of the adjacent output branch of the optical waveguide, at the interface with the dielectric buffer layer, which acts as a capacitor, referenced by $C_B$ in FIG. 3. This capacitor blocks the free electrical charges, thus resulting in a screening effect for the applied switching voltage. To maintain the electro-optical coupling (the switched status in the switch) stable, it is therefore necessary to continuously adjust (DC-drift effect) the switching voltage applied between the electrodes, so compensating for the screening effect.

A weaker DC-drift effect also occurs in digital electro-optical switches without a dielectric buffer layer between the electrodes and the substrate due to the presence of a virgin crystal surface of the substrate between the electrodes and the adjacent output branch of the optical waveguide. Due to its not perfect dielectricity, this virgin surface acts as a parallel between a capacitor and a resistor, referenced by $C_S$ and $R_S$ in FIG. 4, thus resulting in a weaker screening effect for the applied switching voltage.

The objective of present invention is to provide an improved digital electro-optical switch which allows the switching voltage applied to the electrodes to be significantly reduced and the DC-drift effect to be completely cancelled out.

This objective is achieved by the present invention in that it relates to a digital electric-optical switch, as defined in the appended claims.

The present invention achieves the aforementioned objective by removing the buffer layer in the structure shown in FIG. 3, and forming between each electrode and the surface of the substrate underneath a thin film made of an optically transparent and weakly electrically conductive material, such as Indium Tin Oxide (ITO), each thin film being wider than the electrode above so that it also extends partially upon the adjacent output branch of the optical waveguide. Should the operating frequency range of the digital electro-optical switch so require, a buffer layer may also, be re-introduced between the electrodes and the optically transparent, electrically conductive thin film to reduce the propagation speed of the electrical signal and make it equal to the propagation speed of the optical signal. In this case, the electrodes are connected to the optically transparent, electrically conductive thin film through via holes formed in the buffer layer.

The interposition of such a thin film between the substrate and the electrodes allows the switching voltage applied between the outer electrodes to be significantly reduced for the same effective electrical field applied to the optical waveguide, so improving the electro-optical efficiency of the digital electro-optical switch. Additionally, the interposition of such a thin film between the substrate and the electrodes allows the screening effect, and hence the DC-Drift effect, to be completely cancelled out.

BRIEF DESCRIPTION OF THE DRAWINGS

For a better understanding of the present invention, preferred embodiments, which are intended purely by way of example and are not to be construed as limiting, will now be described with 4 reference to the attached drawings (all not to scale), wherein.

DETAILED DESCRIPTION OF PREFERRED EMBODIMENTS OF THE INVENTION

The following discussion is presented to enable a person skilled in the art to make and use the invention. Various modifications to the embodiments will be readily apparent to those skilled in the art, without departing from the scope of the present invention as claimed. Thus, the present invention is not intended, to be limited to the embodiments shown, but is to be accorded the widest scope consistent with the principles and features disclosed herein and defined in the appended claims.

Figure 5:
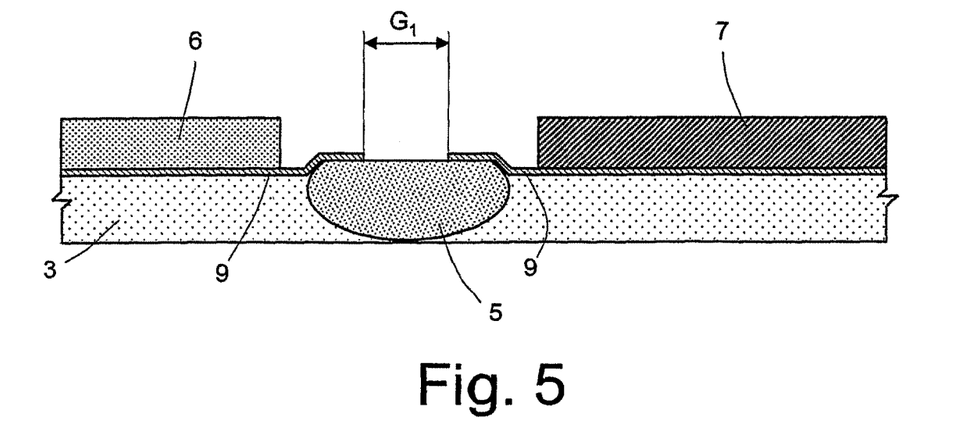
FIG. 5 shows a cross-section of an area of a digital electro-optical switch according to a preferred embodiment of the present invention.

FIG. 5 shows a cross-section of an area of a digital electro-optical switch, according to a preferred embodiment of the present invention, wherein same reference numerals and signs as those in FIGS. 3 and 4 designate the same elements, which will not be described again.

As shown in FIG. 5, no dielectric buffer layer 8 is formed and a thin layer or film 9 made of an optically transparent and weakly electrically conductive material, such as Indium Tin Oxide (ITO), is, formed between each electrode 6, 7 and the surface of the substrate 3 underneath. Each thin film 9 is 0.05-0.3 µm-thick and is so sized that the inter-film gap $G_1$ (distance between adjacent thin films 9) is lower than the inter-electrode gap $G_0$, and in particular ranges from 4 to 8 µm depending on the operating wavelength. More in detail, each thin film 9 laterally projects over the respective electrode 6, 7 above and partially overlaps the adjacent output branch 5 of the optical waveguide 2.

Figure 6:
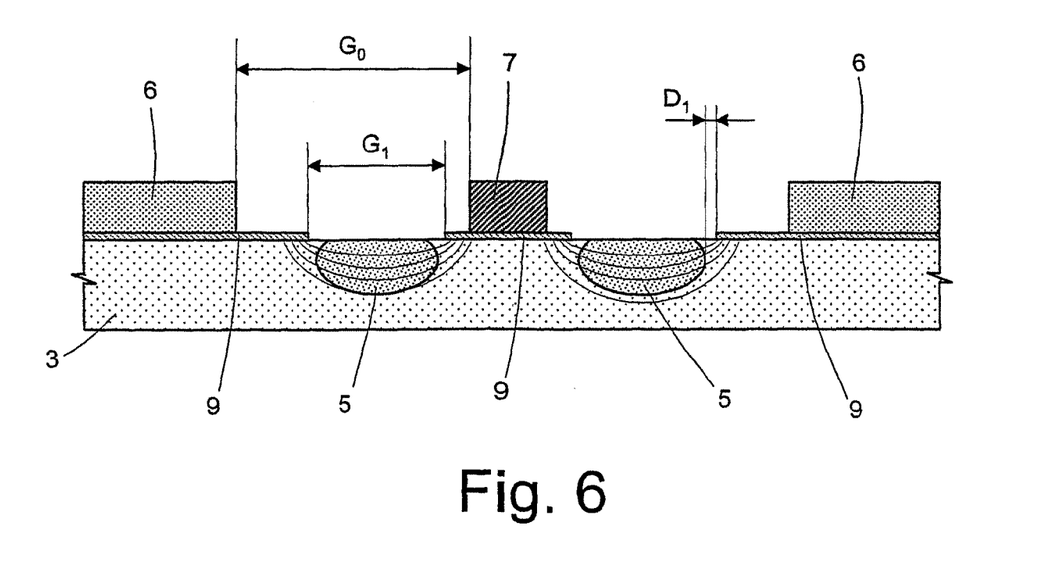
FIGS. 6 and 7 show cross-sections of an area of a digital electro-optical switch according to different embodiments of the present invention.

FIG. 6 shows a different embodiment of the digital electro-optical switch 1 according to present invention, wherein the width of each thin film 9 is lower than that in FIG. 5, such that the thin films 9 do not extend partially over the adjacent output branches 5 of the optical waveguide 2, but a gap $D_1$ between each thin film 9 and the adjacent output branch 5 of the optical waveguide 2 is formed which ranges from 0 to 10 µm. In this embodiment, the inter-film gap G1 ranges from 8 to 20 µm depending on the operating wavelength.

Figure 7:
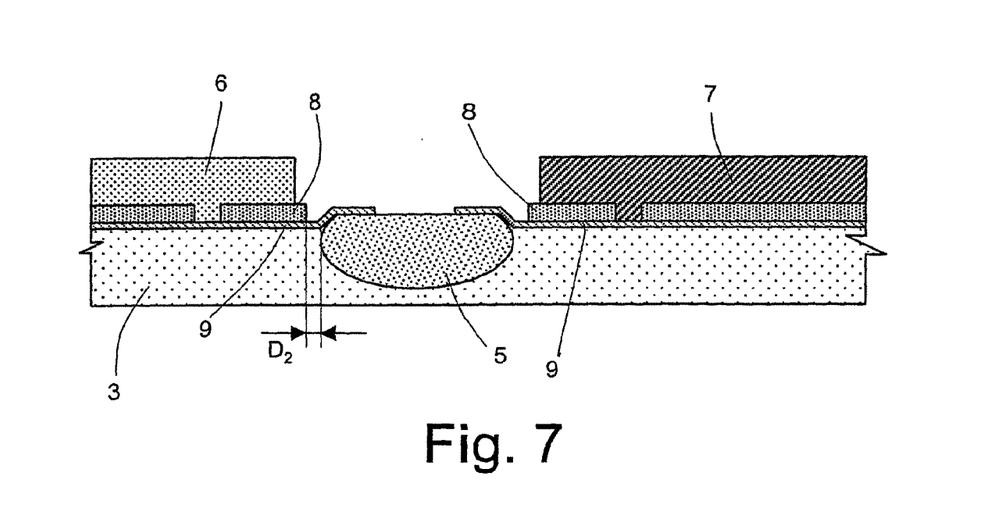

FIG. 7 shows a yet further embodiment of the digital electro-optical switch 1 according to present invention, wherein, should the operating frequency range of the digital electro-optical switch 1 so require, a dielectric ($SiO_2$) buffer layer 8 is provided between each electrode 6, 7 and the optically transparent, electrically conductive thin film 9 underneath to reduce the propagation speed of the electrical signal and make it equal to the propagation speed of the optical signal. In this case, the electrodes 6, 7 are connected to the optically transparent, electrically conductive thin films 9 underneath through via holes formed in the buffer layers 8. Unlike the buffer layer 8 in the embodiment shown in FIGS. 2 and 3, where a continuous dielectric buffer layer 8 is provided extending on the substrate surface 3, over the optical waveguide 2, in this different embodiment the dielectric buffer layer 8 is only arranged between each electrode 6, 7 and the thin film 9 underneath and hence do not extend over the optical waveguide 2. As shown in FIG. 7, each buffer layer 8 projects laterally over the respective electrode 6, 7 toward the adjacent output branch 5 of the optical waveguide 2 such that a gap $D_2$ between each buffer layer and the adjacent output branch 5 of the optical waveguide 2 is formed which ranges from 0 to 10 µm.

Figure 8:
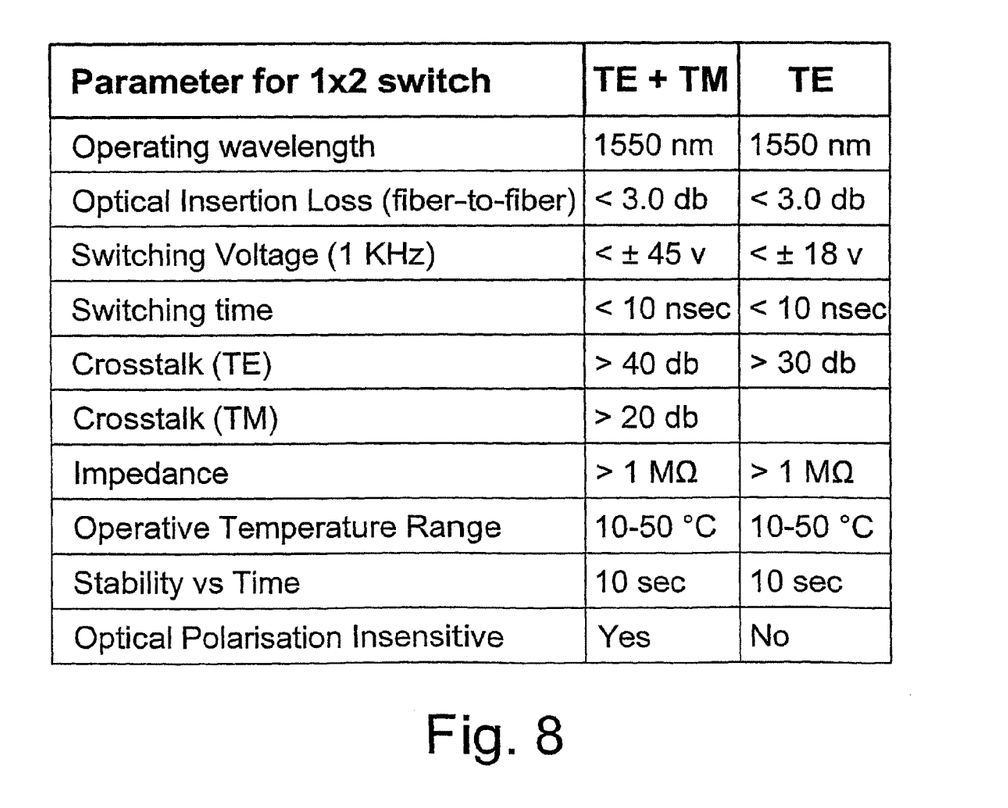
FIG. 8 shows a table listing operating parameters of the digital electro-optical. switch according to the present invention.

FIG. 8 shows a table listing various operating parameters of the digital electro-optical switch 1 according to the present invention.

From the foregoing, it may be immediately appreciated that the electro-optical properties of the thin films 9 underneath the electrodes 6, 7 allow the switching voltage applied between the outer electrodes 6 to be significantly reduced for the same effective electrical field applied to the output branches 5 of the optical waveguide 2, so increasing the electro-optical efficiency of the digital electro-optical switch 1. In fact, electrical conductivity of the thin films 9 and the fact that the inter-film gap $G_1$ is lower than the inter-electrode gap $G_0$ in the digital electro-optical switch 1 of FIGS. 2, 3 and 4, cause the electrical field lines to extend between adjacent thin films 9 instead of between adjacent electrodes 6, 7, and this results in an increased overlap integral between the optical field in the waveguides 2 and the applied electrical field, with respect to the one in the prior art digital electro-optical switches 1 shown in FIGS. 2 to 4. Additionally, thanks to the optical transparency (property of allowing light to pass) of the thin films 9, they do not absorb the residual optical energy flowing through the output branches 5 of the optical waveguide 2, thus not adversely affecting the isolation of the optical waveguide 2 from the electrodes 6, 7.

Moreover, the electrical property of the thin films 9 allows the DC-drift effect to be completely cancelled out. In fact, the free electrical charges produced during the formation of the optical waveguide 2 are bled off by the external voltage source connected to the electrodes 6, 7, thus canceling out any electrical charge accumulation ($C_S$=0) on the surface of the output branch 5 of the optical waveguide 2 and hence any screening effect which is the cause of the DC-drift effect.

Finally, it is clear that numerous modifications and variants can be made to the present invention, all falling within the scope of the invention, as defined in the appended claims.

In particular, it may be appreciated that the present invention may also be theoretically applied to any type of digital electro-optical switches, especially also to digital electro-optical switches with more than two output branches and operable to selectively supply an input optical signal received at the input branch to more than one output branches.

Moreover, the substrate 3 can be made of other electro-optical material, such as lithium tantalate ($LiTaO_3$), or Potassium Titanyl Phosphate (KTP).

The invention claimed is:

1. An electro-optical switch comprising:
   an X-cut electro-optical substrate;
   a Y-shaped optical waveguide formed in the substrate and including an input branch intended to be connected to an input optical waveguide, and output branches intended to be connected to respective output optical waveguides; and
   an electrically conductive electrode structure formed on the substrate and so arranged as to be operatively coupled to the optical waveguide to cause an optical signal received at the input optical waveguide to be selectively supplied to at least one of the output optical waveguides; wherein the electrode structure includes an inner electrode arranged between the output branches, substantially at a branching area of the optical waveguide, and intended to be grounded; and outer electrodes arranged outside the output branches, on opposite sides of the inner electrode, and intended to be electronically supplied with a switching signal; wherein the electrode structure is operable to cause the electro-optical switch to switch between a first switching state wherein transmission of optical energy is enhanced between the input branch and a first one of the output branches, and substantially inhibited in a second one of the output branches, and a second switching state wherein transmission of optical energy is enhanced between the input branch and the second output branch, and substantially inhibited in the first output branch;
   characterized by an optically transparent, electrically conductive film arranged between each electrode and the substrate and so sized that an inter-film gap between each pair of adjacent optically transparent, electrically conductive films is smaller than an inter-electrode gap between each pair of adjacent electrodes;
   wherein each optically transparent, electrically conductive film is so sized as to laterally overlap partially an adjacent output branch of the optical waveguide.

2. The device according to claim 1, wherein each optically transparent, electrically conductive film is laterally spaced apart from an adjacent output branch of the optical waveguide to form a gap therebetween.

3. The device according to claim 1, wherein each optically transparent, electrically conductive film protrudes laterally beyond the electrode thereabove toward an adjacent output branch of the optical waveguide.

4. The device according to claim 1, further comprising:
   a dielectric buffer layer arranged between each optically transparent, electrically conductive film and the respective electrode thereabove; and
   an electrical connection between each optically transparent, electrically conductive film and the respective electrode thereabove.

5. The device according to claim 4, wherein each buffer layer projects laterally over beyond the respective electrode toward a respective adjacent output branch of the optical waveguide to form a gap therebetween.

6. The device according to claim 4, wherein the dielectric buffer layers are 0.2-2 μm-thick.

7. The device according to claim 1, wherein the electro-optical substrate is 200-1000 μm-thick, the electrically conductive electrodes are 1-40 μm-thick, and the optically transparent, electrically conductive films are 50-300 nm-thick.

8. The device according to claim 1, wherein the inter-film gap ranges from 4 to 20 μm, and the inter-electrode gap ranges from 10 to 40 μm.

9. An electro-optical switch comprising:
an X-cut electro-optical substrate;
a Y-shaped optical waveguide formed in the substrate and including an input branch intended to be connected to an input optical waveguide, and output branches intended to be connected to respective output optical waveguides; and
an electrically conductive electrode structure formed on the substrate and so arranged as to be operatively coupled to the optical waveguide to cause an optical signal received at the input optical waveguide to be selectively supplied to at least one of the output optical waveguides; wherein the electrode structure includes an inner electrode arranged between the output branches, substantially at a branching area of the optical waveguide, and intended to be grounded; and outer electrodes arranged outside the output branches, on opposite sides of the inner electrode, and intended to be electronically supplied with a switching signal to cause the electro-optical switch to switch between a first switching state wherein transmission of optical energy is enhanced between the input branch and a first one of the output branches, and substantially inhibited in a second one of the output branches, and a second switching state wherein transmission of optical energy is enhanced between the input branch and the second output branch, and substantially inhibited in the first output branch;
an optically transparent, electrically conductive film arranged between each electrode and the substrate and so sized that an inter-film gap between each pair of adjacent optically transparent, electrically conductive films is smaller than an inter-electrode gap between each pair of adjacent electrodes;
a dielectric buffer layer arranged between each optically transparent, electrically conductive film and the respective electrode thereabove; and
an electrical connection between each optically transparent, electrically conductive film and the respective electrode thereabove;
wherein the optically transparent, electrically conductive films are electrically connected to the respective electrodes through via holes formed in the dielectric buffer layers.

10. The device according to claim 9, wherein each optically transparent, electrically conductive film is laterally spaced apart from an adjacent output branch of the optical waveguide to form a gap therebetween.

11. The device according to claim 9, wherein each optically transparent, electrically conductive film protrudes laterally beyond the electrode thereabove toward an adjacent output branch of the optical waveguide.

12. The device according to claim 9, wherein each buffer layer projects laterally over the respective electrode toward a respective adjacent output branch of the optical waveguide to form a gap therebetween.

13. An electro-optical switch comprising:
an X-cut electro-optical substrate;
a Y-shaped optical waveguide formed in the substrate and including an input branch intended to be connected to an input optical waveguide, and output branches intended to be connected to respective output optical waveguides; and
an electrically conductive electrode structure formed on the substrate and so arranged as to be operatively coupled to the optical waveguide to cause an optical signal received at the input optical waveguide to be selectively supplied to at least one of the output optical waveguides; wherein the electrode structure includes an inner electrode arranged between the output branches, substantially at a branching area of the optical waveguide, and intended to be grounded; and outer electrodes arranged outside the output branches, on opposite sides of the inner electrode, and intended to be electronically supplied with a switching signal to cause the electro-optical switch to switch between a first switching state wherein transmission of optical energy is enhanced between the input branch and a first one of the output branches, and substantially inhibited in a second one of the output branches, and a second switching state wherein transmission of optical energy is enhanced between the input branch and the second output branch, and substantially inhibited in the first output branch;
an optically transparent, electrically conductive film arranged between each electrode and the substrate and so sized that an inter-film gap between each pair of adjacent optically transparent, electrically conductive films is smaller than an inter-electrode gap between each pair of adjacent electrodes;
a dielectric buffer layer arranged between each optically transparent, electrically conductive film and the respective electrode thereabove; and
an electrical connection between each optically transparent, electrically conductive film and the respective electrode thereabove;
wherein the optically transparent, electrically conductive films are electrically connected to the respective electrodes through via holes formed in the dielectric buffer layers;
wherein each optically transparent, electrically conductive film is so sized as to laterally overlap partially an adjacent output branch of the optical waveguide.

14. The device according to claim 13, wherein each optically transparent, electrically conductive film protrudes laterally beyond the electrode thereabove toward an adjacent output branch of the optical waveguide.

15. The device according to claim 13, wherein each buffer layer projects laterally beyond the respective electrode toward a respective adjacent output branch of the optical waveguide to form a gap therebetween.

* * * * *

UNITED STATES PATENT AND TRADEMARK OFFICE
CERTIFICATE OF CORRECTION

| | | |
|---|---|---|
| PATENT NO. | : 8,326,096 B2 | Page 1 of 1 |
| APPLICATION NO. | : 12/673341 | |
| DATED | : December 4, 2012 | |
| INVENTOR(S) | : Pierno et al. | |

It is certified that error appears in the above-identified patent and that said Letters Patent is hereby corrected as shown below:

In the Claims

Column 6, Line 65, in Claim 5, delete "over beyond" and insert -- beyond --, therefor.

Signed and Sealed this
Fourth Day of November, 2014

Michelle K. Lee
*Deputy Director of the United States Patent and Trademark Office*